(12) United States Patent
Josemans

(10) Patent No.: US 11,060,868 B2
(45) Date of Patent: Jul. 13, 2021

(54) WEAK VALUE AMPLIFICATION CORIOLIS VIBRATORY GYROSCOPE

(71) Applicant: Garrett K. Josemans, Fredericksburg, VA (US)

(72) Inventor: Garrett K. Josemans, Fredericksburg, VA (US)

(73) Assignee: United States of America, as represented by the Secretary of the Navy, Arlington, VA (US)

(*) Notice: Subject to any disclaimer, the term of this patent is extended or adjusted under 35 U.S.C. 154(b) by 0 days.

(21) Appl. No.: 16/844,378

(22) Filed: Apr. 9, 2020

(65) Prior Publication Data

US 2020/0240786 A1 Jul. 30, 2020

Related U.S. Application Data

(60) Provisional application No. 62/831,348, filed on Apr. 9, 2019.

(51) Int. Cl.
*G01C 19/64* (2006.01)
*G01C 19/72* (2006.01)

(52) U.S. Cl.
CPC ........... *G01C 19/64* (2013.01); *G01C 19/721* (2013.01)

(58) Field of Classification Search
CPC ............... G01C 19/56; G01C 19/5656; G01C 19/5684; G01C 19/5691; G01C 19/5712; G01C 19/5719; G01C 19/5776; G01C 19/64; G01C 19/66; G01C 19/661; G01C 19/665; G01C 19/668; G01C 19/721; G01C 19/728
See application file for complete search history.

(56) References Cited

U.S. PATENT DOCUMENTS

| | | | | |
|---|---|---|---|---|
| 4,572,670 A | * | 2/1986 | Fredrickson | ....... G01C 19/5642 250/227.27 |
| 4,628,734 A | | 12/1986 | Watson | ........................... 73/505 |
| 5,430,342 A | | 7/1995 | Watson | .................... 310/316.01 |

(Continued)

OTHER PUBLICATIONS

Dixon, P. Ben et al. "Ultrasensitive Beam Deflection Measurement via Interferometric Weak Value Amplification". Physical Review Letters 102, 173601, Apr. 27, 2009. (Year: 2009).*

(Continued)

*Primary Examiner* — Michael A Lyons
(74) *Attorney, Agent, or Firm* — Gerhard W. Thielman

(57) ABSTRACT

A weak value amplification (WVA) Corolis vibratory gyroscope (CVG) is provided for measuring angular rate. The WVA CVG includes a vibratory structure that induces a deflection; an optical weak value amplifier that amplifies the deflection as an amplified signal; and a weak value detector to measure the amplified signal to determine the angular rate. Further exemplary embodiments provide first and second plates, a laser, a polarizing filter, a beam-splitter, left and right mirrors, a half-wave plate, a retarder and a detector. The laser emits an emission beam of photons. The polarizing filter polarizes the emission beam. The beam-splitter divides the beam into left and right beams reflected by the left and right mirrors. The retarder imposes a phase difference between the left and right beams. The detector measures the left and right beams.

5 Claims, 4 Drawing Sheets

(56) References Cited

U.S. PATENT DOCUMENTS

| | | | | |
|---|---|---|---|---|
| 6,474,162 | B1* | 11/2002 | Voss | G01C 19/5614 310/370 |
| 2010/0309474 | A1* | 12/2010 | Kilic | G01C 19/5776 356/460 |
| 2012/0242999 | A1* | 9/2012 | Turner | G01B 9/02057 356/491 |
| 2015/0168442 | A1* | 6/2015 | Hutchison | G01P 15/093 356/477 |
| 2019/0196053 | A1* | 6/2019 | Jordan | G01V 7/04 |

OTHER PUBLICATIONS

Annovazzi-Lodi, Valerio et al. Optical Detection of the Coriolis Force on a Silicon Micromachined Gyroscope. Journal of Microelectromechanical Systems, vol. 12, No. 5, Oct. 2003, pp. 540-549. (Year: 2003).*

Davuluri, Sankar et al. "Gyroscope with two-dimensional optomechanical mirror". New Journal of Physics 19, Nov. 3, 2004, Nov. 6, 2017. (Year: 2019).*

Davuluri, Sankar et al. "Absolute rotation detection by Coriolis force measurement using optomechanics". New Journal of Physics 18, 103047, Oct. 26, 2016. (Year: 2016).*

D. Xia et al. "The Development of Micromachined Gyroscope Structure . . . " Sensors 14 2014. https://www.ncbi.nlm.nih.gov/pmc/articles/PMC3926620/pdf/sensors-14-01394.pdf.

N. W. M. Ritchie et al. "Realization of a Measurement of a 'Weak Value'" Phys. Rev. Lttrs. 66(9) 1991. https://scholarship.rice.edu/bitstream/handle/1911/79437/PhysRevLett.66.1107.pdf?sequence=1.

A. D. Parks et al. "Observation and measurement of an optical Aharonov-Albert-Vaidman effect . . . " Proc. R. Soc. Lund. A 454 1998. https://royalsocietypublishing.org/doi/pdf/10.1098/rspa.1998.0288.

R. Yang et al. "High frequency torsional mode nanomechanical resonators . . . " Diamond & Related Materials 54 2015. http://engr.case.edu/feng_philip/DRM2015-High-frequency%20nanocrystalline%20diamond%20torsional-mode%20NEMS%20resonators.pdf.

* cited by examiner

WEAK VALUE AMPLIFICATION CORIOLIS VIBRATORY GYROSCOPE

CROSS REFERENCE TO RELATED APPLICATION

Pursuant to 35 U.S.C. § 119, the benefit of priority from provisional application 62/831,348, with a filing date of Apr. 9, 2019, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to gyroscopes. In particular, the invention describes a Coriolis vibratory gyroscope (CVG) using weak value amplification (WVA).

Gyroscopes represent a type of inertial motion sensor called angular rate sensors, which traditionally employ a spinning flywheel to provide angular momentum that, when observed from a non-inertial reference frame, appears to move due to the Coriolis effect. Miniaturizations have led to much lighter and smaller gyroscopes with high precision.

Xia et al. present a review in "The Development of Micromachined Gyroscope Structure and Circuitry Technology", *Sensors* 14, 1394-1475 (2014, available at https://www.ncbi.nlm.nih.gov/pmc/articles/PMC3926620/pdf/sensors-14-01394.pdf). Another description is available in U.S. Pat. Nos. 5,430,342 and 4,628,734 both to Watson. These gyroscopes replace spinning wheels with small vibrating components that transfer vibrational energy from one axis to another in response to the Coriolis effect.

Weak measurement of quantum states is described in the literature. Ritchie et al. describe early efforts in "Realization of a Measurement of a 'Weak Value'", *Physical Review Letters*, 66 (9), 1107-1110 (1991, available at https://scholarship.rice.edu/bitstream/handle/1911/79437/PhysRevLett.66.1107.pdf?sequence=1). Parks et al. explains such experimentation in "Observation and measurement of an optical Aharonov-Albert-Vaidman effect", *Proc. R. Soc. Lond. A* 454, 2997-3008 (1998, available at https://royalsocietypublishing.org/doi/pdf/10.1098/rspa.1998.0288).

SUMMARY

Conventional gyroscopes yield disadvantages addressed by various exemplary embodiments of the present invention. In particular, various exemplary embodiments provide a weak value amplification (WVA) Coriolis vibratory gyroscope (CVG) for measuring angular rate. The WVA CVG includes a vibratory structure that induces a deflection; an optical weak value amplifier that amplifies the deflection as an amplified signal; and a weak value detector to measure the amplified signal to determine the angular rate.

The exemplary WVA CVG includes a vibrating component and an optical readout component that employs WVA to enhance the sensitivity of the exemplary embodiment. The optical readout component is an interferometer mounted on a rigid plate, and the vibrating component is a small flat rectangular crystal. The crystal and the plate contact each other at one of the corners of the plate and the center of the flat surface of the crystal such that the crystal is symmetric about the corner of the plate. The corner of the plate is the symmetrical corner of an interferometer, where the opposite corner is the location at which a coherent laser beam enters and exits the interferometer.

Within the plate, a beam of coherent laser light enters an interferometric loop via a beam-splitter that splits the beam into left and right beams. Within the loop a combination of retarders introduce a small phase difference between the left and right beams. The crystal sits at the symmetric point of the loop and deflects about an axis passing parallel through the plane of its flat surface and perpendicular to the plate. This causes the left and right beams to displace within the plane of the plate. The beams recombine and exit the loop at the beam-splitter and the detector measures this displacement, amplified by the process of WVA.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims. The disclosure generally employs metric units with the following abbreviations: length in millimeters (mm), mass in grams (g), and angles in degrees (°) or radians (rad).

This disclosure outlines a concept for a Coriolis vibratory gyroscope (CVG) that achieves significantly high precision through the use of quantum mechanical weak value amplification (WVA). The exemplary concept enhances sensitivity of a gyroscope (gryo) by applying an adjunct quantum measurement technique. Conventional gyros applicable to such enhancements include CVGs, which come in several varieties: vibrating beams, forks, plates, shells, rings, etc. In principle, the proposed quantum measurement technique can be applied to any CVG to produce an angular rate measurement or whole angle measurement.

Figure 1:
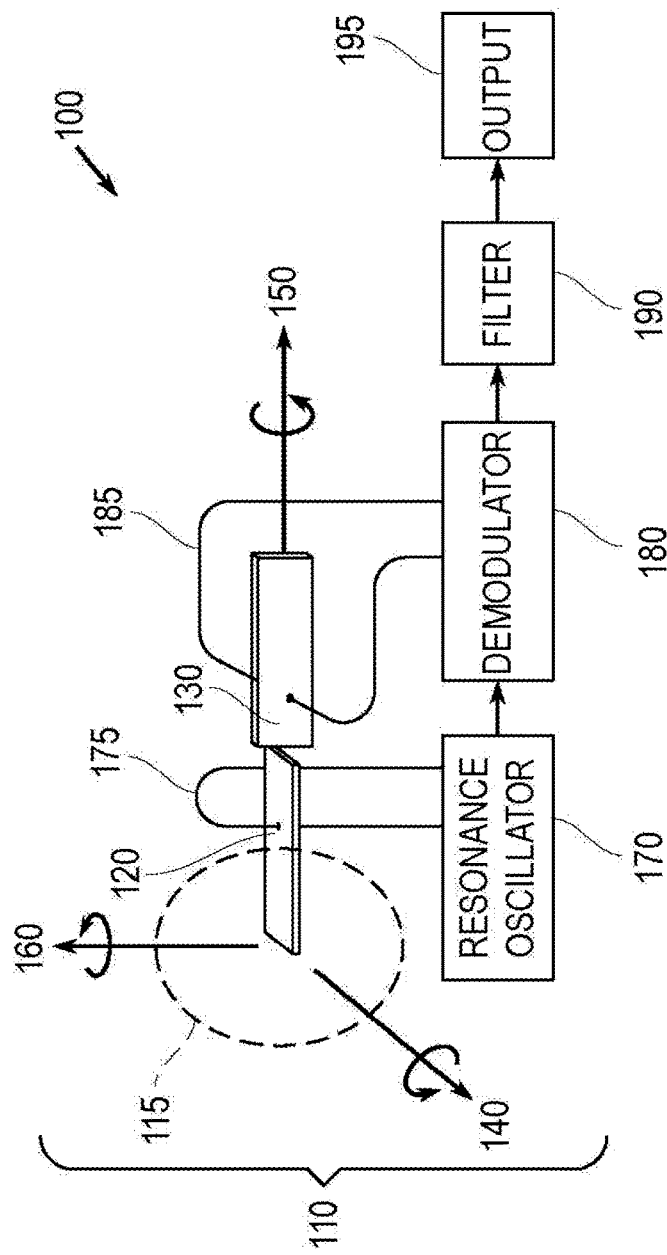
FIG. 1 is an isometric representational view of a piezoelectric crystal vibration structure.

FIG. 1 shows a schematic view 100 of a piezoelectric vibrating beam gyroscope structure 110 with a frame of reference 115 about a coordinate origin and having a pair of piezoelectric crystals 120 and 130. Three orthogonal coordinate axes for the non-inertial reference frame include a vibration resonance drive axis 140, a gyroscopic rotation axis 150 and a sense axis 160.

The first crystal 120 lies along a horizontal plane forming the drive and gyroscopic axes 140 and 150. The second crystal 130 lies along a vertical plane formed by the gyroscopic and sense axes 150 and 160. The structure 110 further includes a resonance oscillator 170 for inducing vibration via a wire loop 175 about the drive axis 140, a demodulator 180 for signal conversion to analog via a wire loop 185 for vibrations about the sense axis 160, and a low pass filter 190 for reducing signal noise, that leads to an output 195. Such devices have resonant frequencies in the tens of kilohertz.

The first crystal 120 is fixed at its proximal end to the origin within the inertial reference frame 115, and attached at its distal end to the second crystal 130 lying in tandem along the sense axis 160. The crystals 120 and 130 form a single beam, which is then driven to vibrate about the drive axis 140 via the resonance oscillator 170. Upon application of rotation about the gyroscopic axis 150, the vibrating structure 110 resists this force and begins to vibrate about the sense axis 160. This induced vibration is measured from the non-inertial reference frame 115 and is used to determine the rate of rotation (i.e., angular velocity), or less commonly, the whole angle of rotation (i.e., orientation).

An exemplary WVA CVG achieves significantly high precision through the use of quantum mechanical WVA. The proposed concept is for a hybrid quantum sensor that employs conventional gyroscope technology and enhances its sensitivity through the application of an adjunct quantum-optical measurement technique.

Among CVGs, vibrating beam and tuning fork gyros are the most feasible candidates for implementing the exemplary quantum measurement scheme. The CVG contains a mechanical structure (e.g., beam or fork) set to vibrate along a drive axis 140. When a rotational force is applied about the gyroscopic axis 150 orthogonal to the oscillatory mode, vibrational energy transfers to the remaining orthogonal direction, namely the sense axis 160. A common architecture for this type of device measures the induced response by reading out the angular deflection of the structure about the sense axis 160 and calculating the rotational force that causes the deflection.

This is most commonly measured by setting a tongue as the cathode of a capacitor and measuring the change in capacitance as the vibrating component of the CVG deflects toward or away from a corresponding stationary anode, hence inducing a change in capacitance. For a parallel plate-type capacitor, the capacitance C is:

$$C = \frac{\varepsilon_0 \cdot A}{g}, \quad (1)$$

where g is the gap between cathode and anode, $\varepsilon_0$ is vacuum permittivity and A is area.

By making this initial gap between cathode and anode smaller the change in capacitance can be measured more accurately, but as the gap g shrinks, the allowable displacement also diminishes, which ultimately limits sensitivity. Another problem with reducing the dimensions of the vibrating components is the inversely proportional relationship with measurement noise.

As the vibrating structures reduce in size, their susceptibility to thermo-mechanical noise amplifies, which raises the limit of detection (LOD) or minimum detection limit (MDL). Using an optical read-out of the deflection eliminates the need to minimize the gap and instead the performance of an optical read-out scales in proportion to deflection sizes (i.e., larger deflections produce better resolution). Along with the increased measurement resolution, the noise associated with the vibrational components is inversely proportional to their size.

Optical read-out of CVG deflections is not a new concept, but reliable optical readout of the deflections in a CVG remains an active area of research. In fact, in October 2019, *Nature* published an article that detailed the research of a group at Oak Ridge National Laboratory (ORNL) that demonstrated the feasibility of obtaining navigation-grade performance from an optically-read CVG. The performance of the gyro in that article was ultimately limited by the optical read-out approach, suggesting that augmenting their CVG design with a WVA optical read-out can improve the performance of their device.

Figure 2:
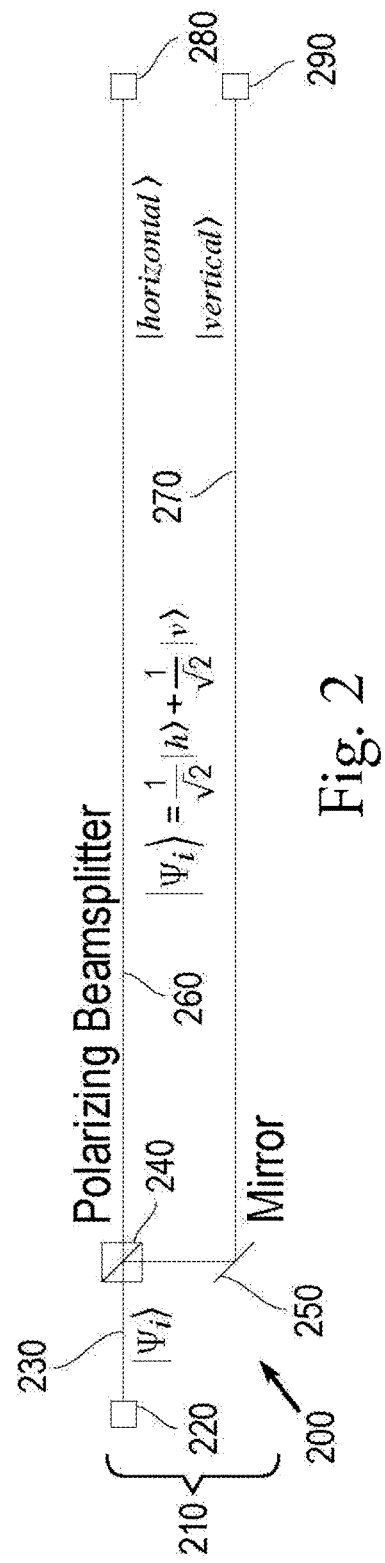
FIG. 2 is a schematic view of a two state quantum system.

FIG. 2 shows a diagram view 200 of a conceptual reflective WVA apparatus 210. A laser 220 emits a coherent beam 230 with initial (pre-selected) wave function $|\psi_i\rangle$ divided by a polarizing beam-splitter 240. A mirror 250 reflects the beam, dividing the beam into a pass "horizontal" $|h\rangle$ beam 260 and a reflection "vertical" $|v\rangle$ beam 270. A pair of detectors 280 and 290 respectively receive the horizontal and vertical beams 260 and 270. The final (post-selected) wave-function $|\psi_f\rangle$ governing this behavior can be expressed as:

$$|\psi_f\rangle = \frac{1}{\sqrt{2}}|h\rangle + \frac{1}{\sqrt{2}}|v\rangle. \quad (2)$$

Note that the horizontal and vertical directions are orthogonal, such that $\langle v|v\rangle = \langle h|h\rangle = 1$ and $\langle h|v\rangle = 0$.

Figure 3:
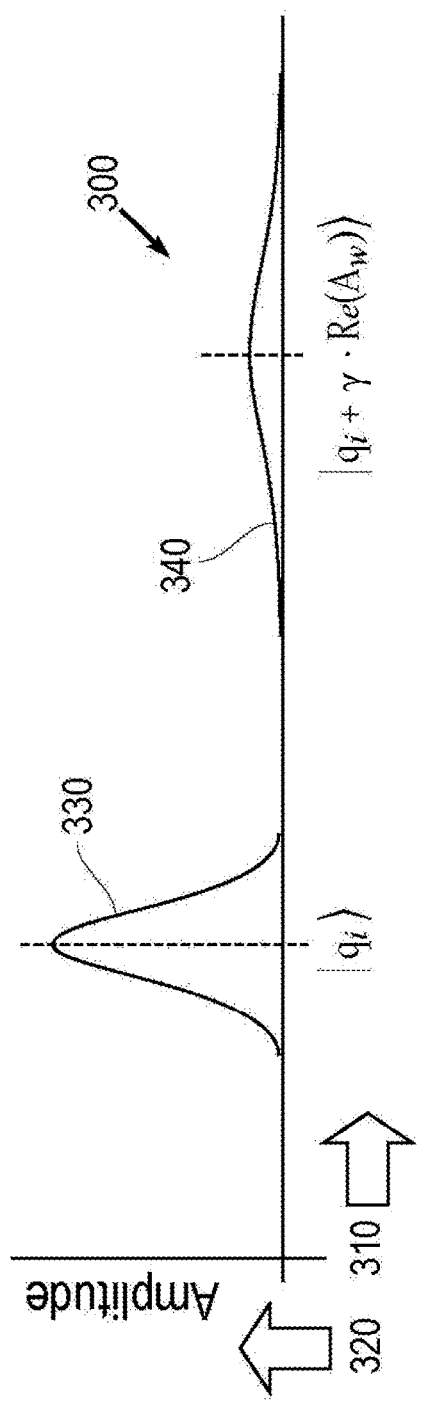
FIG. 3 is a graphical view of amplitude in relation to weak measurement.

FIG. 3 shows a graphical view 300 comparing amplitude with measurement. Unscaled measurement precision 310 denotes the abscissa while amplitude 320 represents the ordinate. A narrowly distributed measurement 330 as quantity $|q_i\rangle$ has a high peak amplitude, whereas a widely distributed weak measurement 340 as quantity $|q_i + \gamma \cdot \text{Re}(A_w)\rangle$ spread by the real part of the weak value $A_w$ (of operator $\hat{A}$) has a low peak amplitude by comparison.

Figure 4:
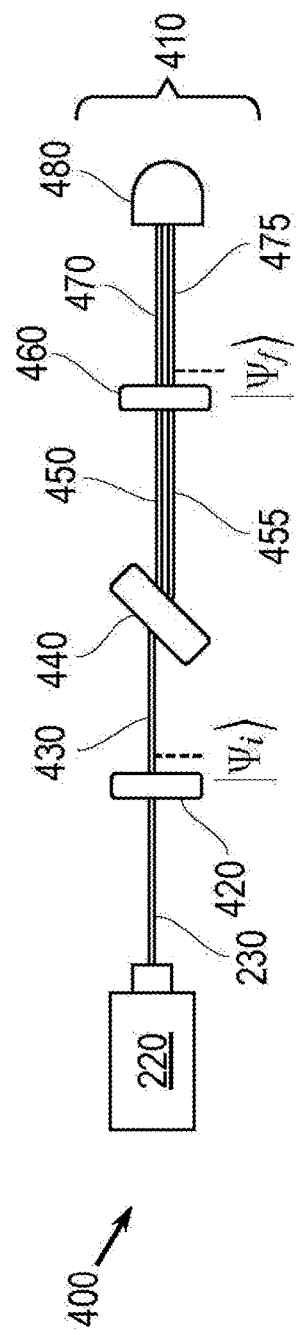
FIG. 4 is a diagram view of a refractive weak measurement apparatus.

FIG. 4 shows a diagram view 400 of a conceptual refractive WVA apparatus 410. The laser source 220 emits a light beam 230 arriving at a pre-selection filter 420 of initial wave function $|\psi_i\rangle$. The resulting beam 430 enters a polarizing refractor 440 to be split as less refracted beam 450 and more refracted beam 455. Both refracted beams arrive at a post-selection filter 460 of final wave function $|\psi_f\rangle$ as respective resulting beams 470 and 475, which both enter a detector 480.

In order to observe an amplified displacement at the detector, the interaction strength must be weak. A weak interaction, in FIG. 5 is one in which the following equation is satisfied:

$$\frac{a}{2 \cdot w_0} \ll \varepsilon \ll 1, \quad (3)$$

where α is the separation distance between beams 470 and 475, ε is a measure of how close to orthogonal the polarization axes of filters 420 and 460 are, in radians—a value of zero representing orthogonal, and $w_o$ is the beam waist.

Figure 5:
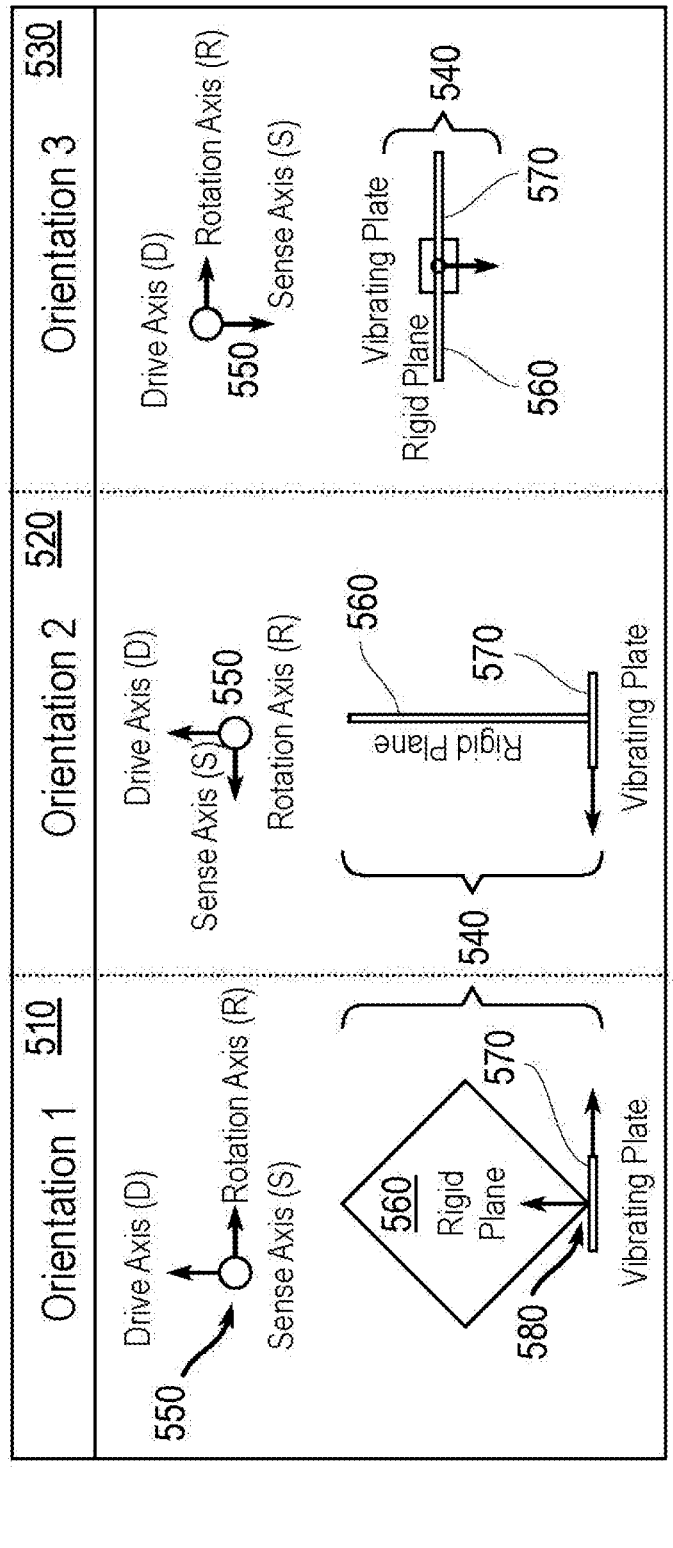
FIG. 5 is a diagram view of component orientations.

FIG. 5 shows a diagram view 500 of three orientations 510, 520 and 530 for an exemplary quantum CVG apparatus 540. A Cartesian coordinate frame 550 is shown for each orientation to identify drive (D) axis 140, gyroscopic rotation (R) axis 150 and sense (S) axis 160. The apparatus 540 includes a flat rigid plane 560 and a vibrating plate 570 that oscillates back and forth along the drive axis 140. The rigid plane 560 (shown in orientation 510 as a square) denotes a thin flat plate with four corners, one corner 580 of which contacts the vibrating plate 570 to produce a 45° (or π/4) angle with the plane's two corresponding adjacent sides that form that corner.

Orientation 510 faces the (R) (D) plane parallel to the rigid plane 560 with sense facing inward. Orientation 520 faces the (D) (S) plane with sense facing left. Orientation 530 faces the (3) (R) plane parallel to the vibrating plate 570 with sense facing downward. Contacting the rigid plane 560 at the touching corner 580, the vibrating plate 570 vibrates along the drive (D) axis 140, which is normal to its surface. Rotation of the vibrating plate 570 about the rotation (R) axis 150 induces a vibration about the sense (S) axis 160.

Figure 6:
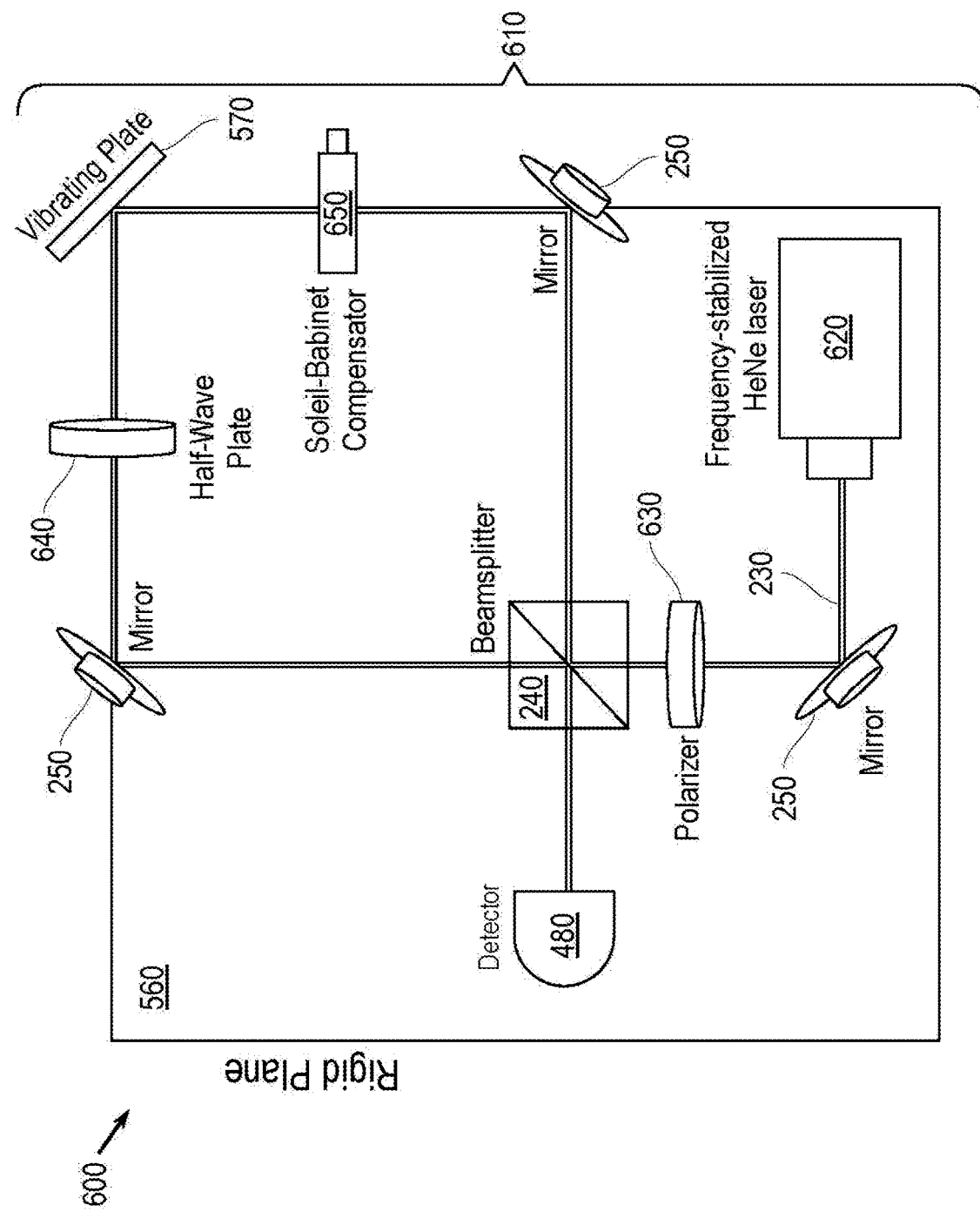
FIG. 6 is a diagram view of an exemplary CVG.

FIG. 6 shows a diagram view 600 of an exemplary quantum CVG apparatus 610. A frequency-stabilized helium neon (HeNe) laser 620 emits a light beam 230 that reflects by a first mirror 250 through a polarizer 630 and enters a beam-splitter 240. The beam 230 subdivides to perpendicular right and up (or "left") mirrors 250. The apparatus 610 further includes a half-wave plate for shifting polarization of the left and right beams by 90° (or π/2) and a continuously variable retarder 650 for imparting a small phase shift. The retarder 650 can comprise fixed and movable birefringent wedges, as with a Soleil-Babinet compensator (SBC).

After reflecting from the up mirror 250, the split beam passes the half-wave plate 640, while after reflecting from the right mirror 250, the split beam passes through the retarder 650. Both split beams arrive at the vibrating plate 570, reflect to their respective opposing mirrors returning to the beam-splitter 240, and enter a detector 480. The laser 620, beam-splitter 240, mirrors 250, polarizer 630, half-wave plate 640, retarder 650 and detector 480 can attach to the rigid plane 560. The exemplary apparatus 610 would weigh a fraction of a gram and have length dimensions in millimeters. The plane 560 serves as the non-inertial frame of reference 115.

The vibrating plate 570 serves as a rectangular piezoelectric crystal and vibrates, free from but within the rigid plane 560, in response to rotations of interest. While applying a rotation about the rotation axis 150, the vibrating plate 570 begins to vibrate about the sense axis 160 in proportion to the applied rotation rate. Measuring the frequency and amplitude with which the vibrating plate 570 oscillates about the sense axis 160 reveals the rotation rate that applies to the exemplary CVG 610. Optically measuring this vibration involves a balanced Sagnac interferometer as provided. For this instrument, the path of the light forms a plane parallel to the rigid plane 560, laterally offset from orientations 520 and 530.

For the exemplary quantum CVG, the vibrating plate 570 is disposed in the light's path and used as the weak interaction. In order to effectively use the vibrations to interact weakly with a beam of light 230, a reflective surface is etched onto the vibrating plate 570. This can be accomplished, in the case of a crystal, with a focused ion beam to cause the reflected light to deflect slightly off the original path by an angle corresponding to the amplitude of the vibrations.

When the ensemble is subsequently post-selected, then the small positional shifts are amplified by a shift operator and observed in the position or momentum basis. By amplifying the spatial shift caused by the vibrating structure interacting with the beam of light 230, the Coriolis effect responsible for the vibrations can be measured to much higher resolution. For a Sagnac interferometer, the "dark" port would be observed. The most common approach measures the spatial translation with an optical camera or a quadrant detector 480. By measuring the amplified spatial shift caused by the vibrating structure interacting with the beam of light 230, the Coriolis effect responsible for the vibrations can be measured to a very high resolution.

Using an optical measurement scheme eliminates the need to minimize the gap and instead its performance scales in proportion to deflection sizes (i.e., larger deflections produce better optical measurements). Conventional capacitance measurement approach is limited to an angular resolution on the order of magnitude of milli-radians, while an optical WVA measurement device 610 has demonstrated pico-radian performance—a potential improvement by nine orders of magnitude.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A Coriolis vibratory gyroscope (CVG) for measuring an angular rate, said CVG comprising:
    a vibratory structure that induces a deflection, said vibratory structure including a flat surface;
    a rigid plane having a corner that contacts said flat surface;
    an optical readout amplifier that enhances said deflection as an amplified signal; and
    a detector to measure said amplified signal to determine the angular rate, wherein said readout amplifier and said detector are mounted to said rigid plane, and said readout amplifier uses quantum weak value amplification (WVA).

2. The CVG according to claim 1, wherein
    said vibratory structure is a rectangular crystal with said deflection being translation along an axis normal to said flat surface, and
    said readout amplifier is an interferometer.

3. The CVG according to claim 2, wherein said interferometer comprises:
    a laser for emitting a coherent beam that enters and exits said interferometer;
    a beam-splitter that divides said beam into a loop of left and right beams; and
    a retarder to induce a phase shift between said left and right beams parallel to said rigid plane, wherein said left and right beams recombine and exit said loop at said beam-splitter.

4. A weak value amplification (WVA) Coriolis vibratory gyroscope (CVG) for measuring angular rate, said WVA CVG comprising:
    a first plate having a corner;
    a second plate having a flat surface that contacts said corner of said first plate at 45° between said flat surface of said second plate and an edge of said first plate, said second plate translating normal to said flat surface;

a laser that emits an emission beam of photons;

a polarizing filter for polarizing said emission beam;

a beam-splitter for dividing said beam into left and right beams;

left and right mirrors for reflecting respective said left and right beams;

a half-wave plate for shifting polarization of said left and right beams by 90°;

a retarder for imparting a phase difference between said left and right beams; and a detector for measuring said left and right beams, wherein said laser, said polarizing filter, said beam-splitter, said mirrors, said half-wave plate, said retarder and said detector are disposed on said first plate, said second plate rotationally oscillates back and forth about an axis normal to said flat surface, and said left and right beams reflecting from said flat surface of said second plate, reflecting from respective said right and left mirrors, passing through said beam-splitter and reaching said detector.

5. The WVA CVG gyroscope according to claim 4, wherein said laser is a helium neon laser.

* * * * *